United States Patent
Wu et al.

(10) Patent No.: US 12,383,109 B2
(45) Date of Patent: Aug. 12, 2025

(54) MAINTENANCE BASE STATION AND CLEANING ROBOT SYSTEM

(71) Applicant: SHENZHEN INXNI INNOVATION TECHNOLOGY CO., LTD., Shenzhen (CN)

(72) Inventors: Jun Wu, Shenzhen (CN); Zhexin Gao, Shenzhen (CN); Jun Yang, Shenzhen (CN); Guichao Yang, Shenzhen (CN); Lirong Ye, Shenzhen (CN); Guodong Zhang, Shenzhen (CN)

(73) Assignee: Shenzhen Inxni Innovation Technology Co., Ltd., Shenzhen (CN)

( * ) Notice: Subject to any disclaimer, the term of this patent is extended or adjusted under 35 U.S.C. 154(b) by 198 days.

(21) Appl. No.: 18/348,457

(22) Filed: Jul. 7, 2023

(65) Prior Publication Data
US 2024/0138640 A1 May 2, 2024

(30) Foreign Application Priority Data
Oct. 31, 2022 (CN) .......................... 202211349283.1

(51) Int. Cl.
| | | |
|---|---|---|
| A47L 9/28 | (2006.01) | |
| A47L 9/30 | (2006.01) | |
| G10L 15/22 | (2006.01) | |

(52) U.S. Cl.
CPC .......... *A47L 9/2873* (2013.01); *A47L 9/2857* (2013.01); *A47L 9/30* (2013.01); *G10L 15/22* (2013.01); *A47L 2201/022* (2013.01)

(58) Field of Classification Search
CPC ........ A47L 9/2873; A47L 9/2857; A47L 9/30; A47L 2201/022; G10L 15/22
See application file for complete search history.

(56) References Cited

U.S. PATENT DOCUMENTS

2013/0221908 A1\* 8/2013 Tang ..................... H02J 7/0042
320/107
2016/0227975 A1  8/2016 Afrouuzi
(Continued)

FOREIGN PATENT DOCUMENTS

| CN | 212382585 U | 1/2021 |
| CN | 212879162 U | 4/2021 |

(Continued)

OTHER PUBLICATIONS

Foreign Official Action mailed in Corresponding Foreign Patent Application No. PCT/CN2023/096959 dated Oct. 31, 2022.

*Primary Examiner* — Thomas E Worden
*Assistant Examiner* — Jay Khandpur
(74) *Attorney, Agent, or Firm* — Rosenberg, Klein & Lee

(57) ABSTRACT

A maintenance base station includes at least one function component, a man-machine interaction component and a controller. The man-machine interaction component is configured to receive a user input and determine a man-machine interaction signal based on the user input. The man-machine interaction signal indicates a device type and a device task type. A device indicated with the device type at least includes a cleaning robot or the function component of the maintenance base station. The controller electrically connecting the function component and the man-machine interaction component, and is configured to receive the man-machine interaction signal and call the corresponding device to work based on the man-machine intction signal.

19 Claims, 8 Drawing Sheets

(56) References Cited

U.S. PATENT DOCUMENTS

| | | | |
|---|---|---|---|
| 2016/0274579 A1* | 9/2016 | So | A47L 11/24 |
| 2018/0157266 A1* | 6/2018 | Xie | G05D 1/0297 |
| 2018/0344116 A1* | 12/2018 | Schriesheim | G05D 1/0016 |
| 2020/0297180 A1* | 9/2020 | Kang | F24F 11/89 |
| 2020/0353822 A1* | 11/2020 | Romanov | A47L 11/4061 |
| 2021/0293961 A1* | 9/2021 | Wang | G01S 17/46 |
| 2022/0369886 A1* | 11/2022 | Liao | A47L 9/30 |

FOREIGN PATENT DOCUMENTS

| CN | 214595740 U | 11/2021 |
|---|---|---|
| CN | 218552246 U | 3/2023 |

* cited by examiner

MAINTENANCE BASE STATION AND CLEANING ROBOT SYSTEM

CROSS-REFERENCE TO RELATED APPLICATIONS

This application claims priority to Chinese Patent Application No. 202211349283.1, filed Oct. 31, 2022, the entire contents of which is incorporated herein by reference.

FIELD OF TECHNOLOGY

The present application relates to the technical field of maintenance base stations, and and more specifically, to a maintenance base station and a cleaning robot system.

BACKGROUND

A maintenance base station is configured to maintain a cleaning robot. The maintenance base station may include a carrier base through which the cleaning robot can be carried. For example, the maintenance base station can provide at least one of maintenance services for the cleaning robot, such as charging, mop cleaning, waste recycling, sewage collection and fresh water supply. Generally, the maintenance base station and the cleaning robot are two separate devices. The cleaning robot can move to the maintenance base station by itself to perform routine maintenances. However, a maintenance base station has the man-machine interaction function usually limited to an on/off key, a display of status readings, and the like; and a cleaning robot has the man-machine interaction function usually limited to an on/off key and a recharging key. That is, user experience is poor as a user needs to operate back and forth between the maintenance base station and the cleaning robot due to the single function of the maintenance base station which is difficult to meet user's requirements for interaction.

SUMMARY

There are provided a maintenance base station and a cleaning robot system. The technical solution is as below:

According to a first aspect of the present disclosure, there is provided a maintenance base station which is configured to cooperate with a cleaning robot. The maintenance base station comprises at least one function component, a man-machine interaction component and a controller. The man-machine interaction component is configured to receive a user input and determine a man-machine interaction signal based on the user input, and the man-machine interaction signal indicates a device type and a device task type. A device indicated by the device type at least comprises the cleaning robot or the function component of the maintenance base station. The controller electrically connecting the function component and the man-machine interaction component, and the controller is configured to receive the man-machine interaction signal and call the corresponding device to work based on the man-machine interaction signal.

According to a second aspect of the present disclosure, there is provided a cleaning robot system, including the maintenance base station above and a cleaning robot.

It should be understood that the general description above and the detailed description below are only exemplary and explanatory, and cannot limit the present disclosure.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some of the embodiments of the present application, and those of ordinary skills in the art may still derive other drawings from these accompanying drawings without creative efforts.

DESCRIPTION OF THE EMBODIMENTS

Figure 1:
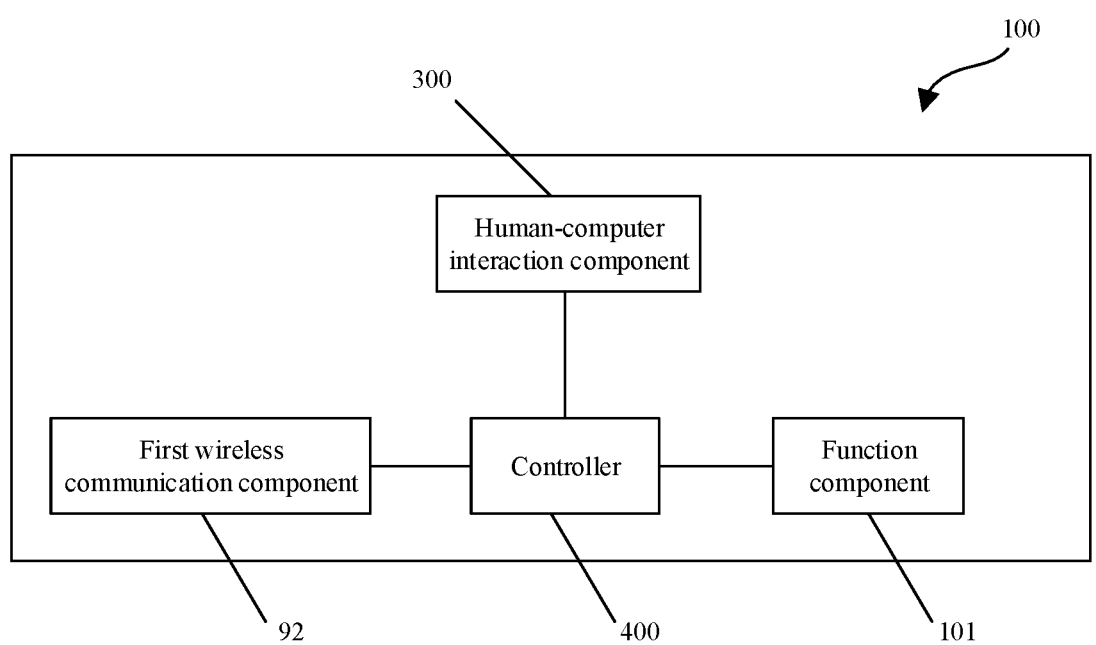
FIG. 1 is a schematic diagram of a hardware configuration of a maintenance base station according to an embodiment of the present application.
Figure 2:
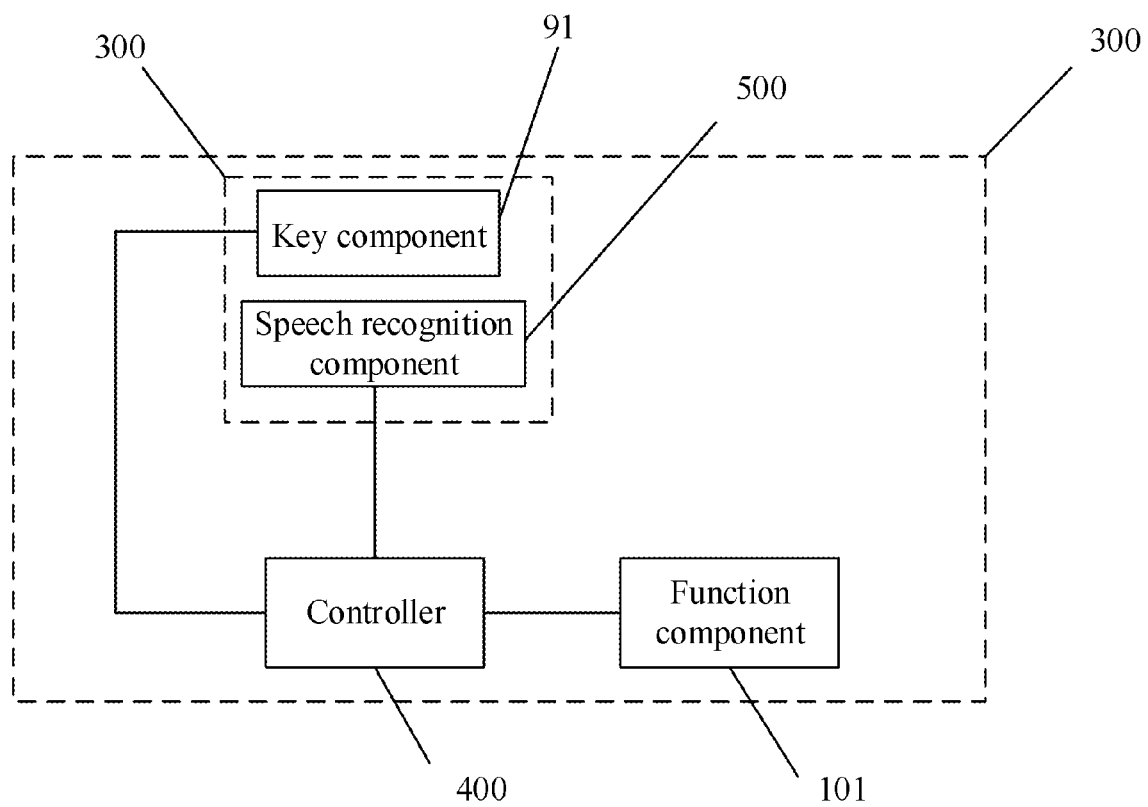
FIG. 2 is a schematic diagram of a hardware configuration of a man-machine interaction component of a maintenance base station according to an embodiment of the present application.
Figure 3:
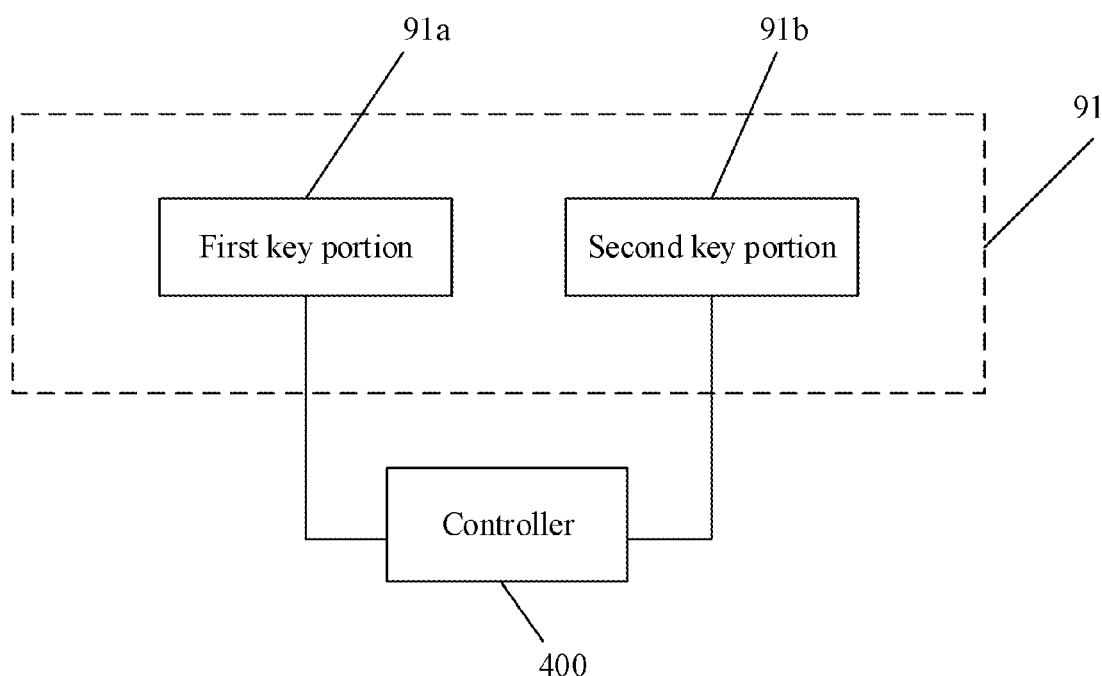
FIG. 3 is a schematic diagram of a hardware configuration of a key component of a maintenance base station according to an embodiment of the present application.
Figure 4:
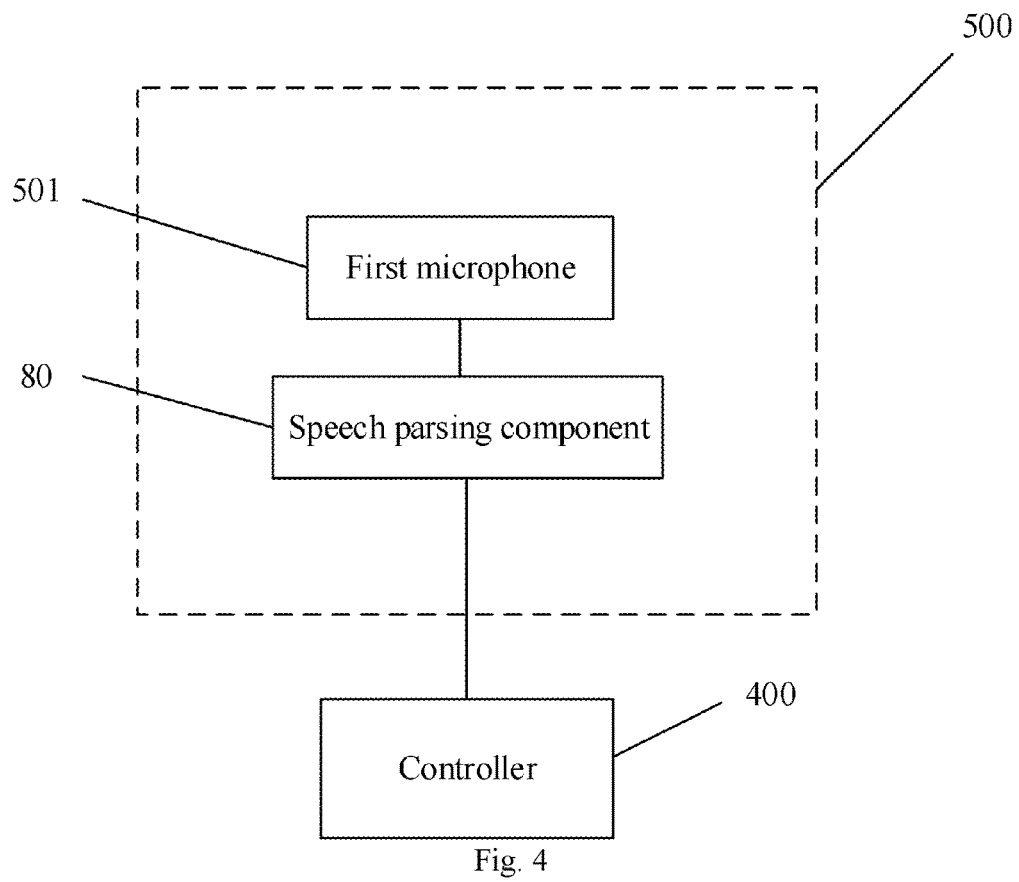
FIG. 4 is a schematic diagram of a hardware configuration of a speech recognition component of a maintenance base station according to an embodiment of the present application.
Figure 5:
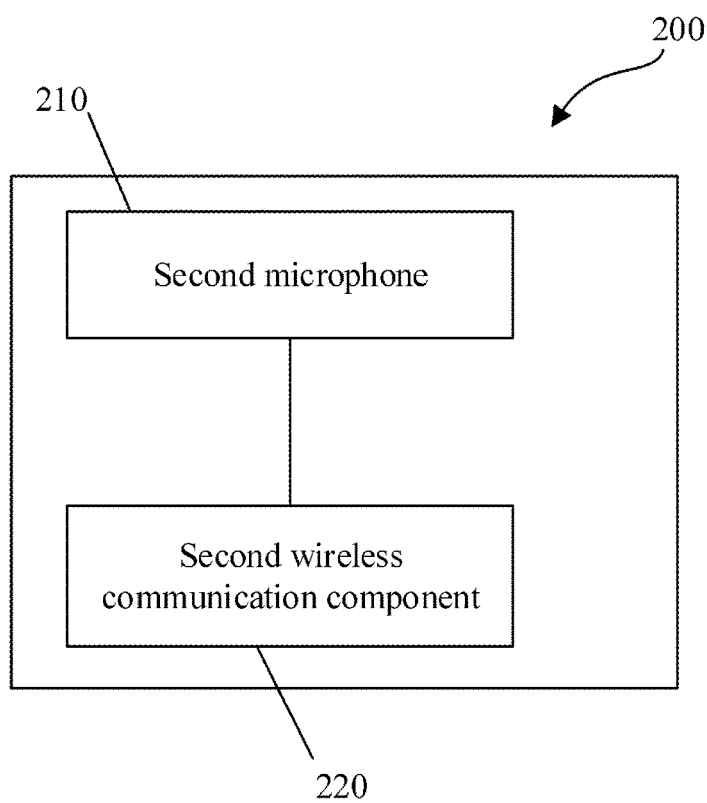
FIG. 5 is a schematic diagram of a hardware configuration of a cleaning robot according to an embodiment of the present application.

The embodiments of the present application are described in detail below. Examples of the embodiments are shown in the accompanying drawings, and the same or similar reference signs indicate the same or similar components or components with the same or similar functions. The embodiments described below with reference to the accompanying drawings are exemplary and intended to explain the present application, but cannot be understood as a limitation of the present application.

In the descriptions of the present application, it should be understood that the orientations or positional relationships indicated by the terms "length", "width", "upper", "lower", "front", "rear", "left", "right", "perpendicular", "horizontal", "top", "bottom", "inside", "outside", and the like are based on the orientations or positional relationships shown in the accompanying drawings, are merely intended to facilitate the descriptions of the present application and simplify the descriptions, are not intended to indicate or imply that the apparatuses or components mentioned in the present application must have specific orientations, or be constructed and operated for a specific orientation, and therefore shall not be construed as a limitation to the present application.

In addition, the terms "first", "second", etc. are merely intended for a purpose of description, and shall not be understood as an indication or implication of relative importance or implicit indication of the number of indicated technical features. Therefore, a feature limited by "first" or "second", etc. may explicitly or implicitly include one or more features. In the description of the present application, the phrase "a plurality of" means two or more, unless otherwise explicitly and specifically defined.

In the description of the present application, unless otherwise expressly specified and limited, the terms "mount", "connected", "connect", "fix", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skills in the art, the specific meaning of the foregoing terms in the present application may be understood according to specific circumstances.

Referring to FIGS. 1 to 5, embodiments of the present application provide a maintenance base station 100. The maintenance base station 100 is configured to cooperate with a cleaning robot 200, and the maintenance base station 100 includes at least one function component 101, a man-machine interaction component 300 and a controller 400.

The man-machine interaction component 300 is configured to receive a user input and determine a man-machine interaction signal based on the user input. The man-machine interaction signal indicates a device type and a device task type, and the device indicated by the device type is the cleaning robot 200 or the function component of the maintenance base station 100.

The controller 400 is electrically connected to the man-machine interaction component 300, and is configured to receive the man-machine interaction signal and call the corresponding device to work based on the man-machine interaction signal.

In the maintenance base station 100 and a cleaning robot system 1000 according to the embodiments of the present application, the man-machine interaction component 300 is configured to receive a user input and determine a man-machine interaction signal based on the user input, the man-machine interaction signal indicates a device type and a device task type, and a device indicated with the device type is the cleaning robot 200 or the function component 101 of the maintenance base station 100; and the controller 400 is electrically connected to the man-machine interaction component 300, and the controller 400 is configured to receive the man-machine interaction signal and call the corresponding device to work based on the man-machine interaction signal; therefore, the maintenance base station 100 can intelligently recognize the user input and distinguish whether a control object of a user is the cleaning robot 200 or the function component 101 of the maintenance base station 100, and then can call the cleaning robot 200 or the maintenance base station 100 itself to work, thus solving the problem that the user operates back and forth between the maintenance base station 100 and the cleaning robot 200 due to the single function of an existing maintenance base station 100 which is difficult to meet user's requirements for interaction.

It is to be understood that the cleaning robot 200 may be a sweeping robot, a sweeping and mopping integrated robot, a mopping robot, a floor scrubbing robot, a floor washing robot, or an air purification robot, etc. The cleaning robot 200 is configured to perform surface cleaning tasks, can clean dust and debris on the floor in an all-round manner, thus improving the cleanliness of an indoor environment in an all-round manner. The surface cleaning tasks may include any one or a combination of some of sweeping, vacuuming, scrubbing, washing and mopping.

Figure 6:
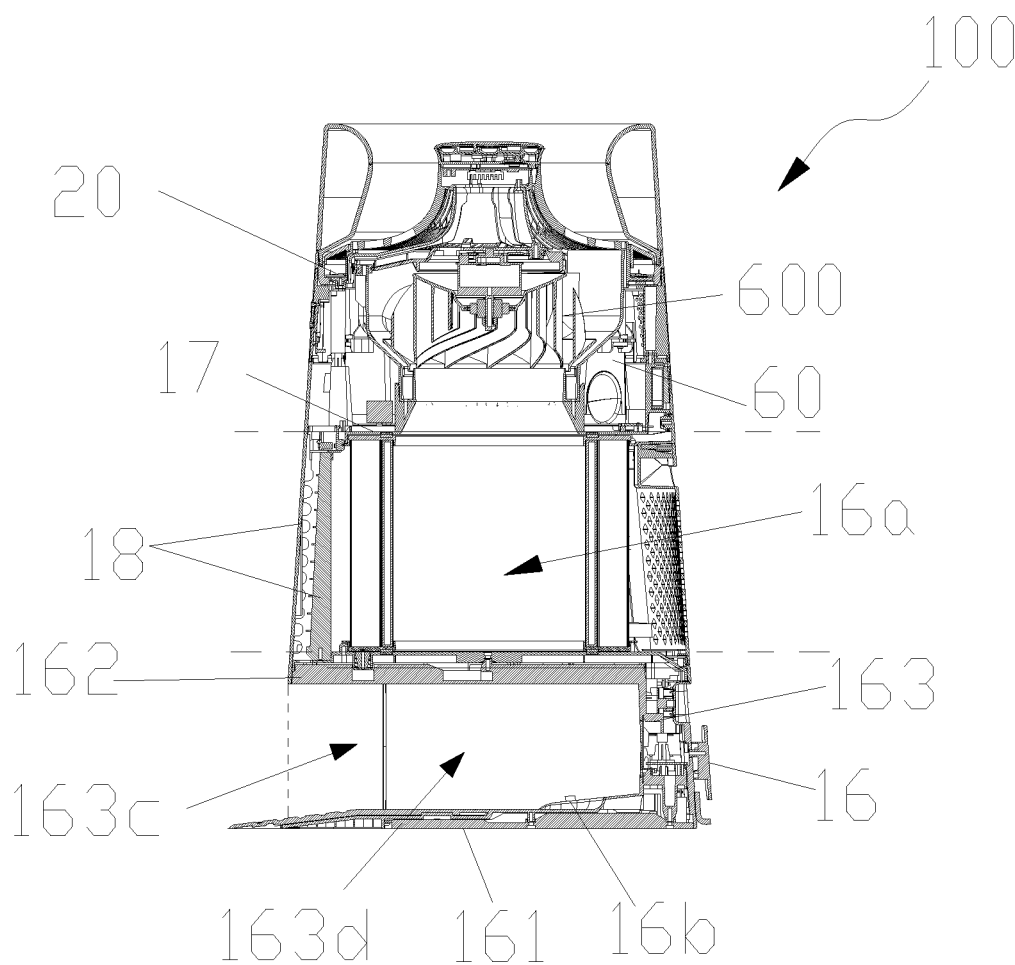
FIG. 6 is a schematic structural diagram of a maintenance base station according to an embodiment of the present application.
Figure 7:
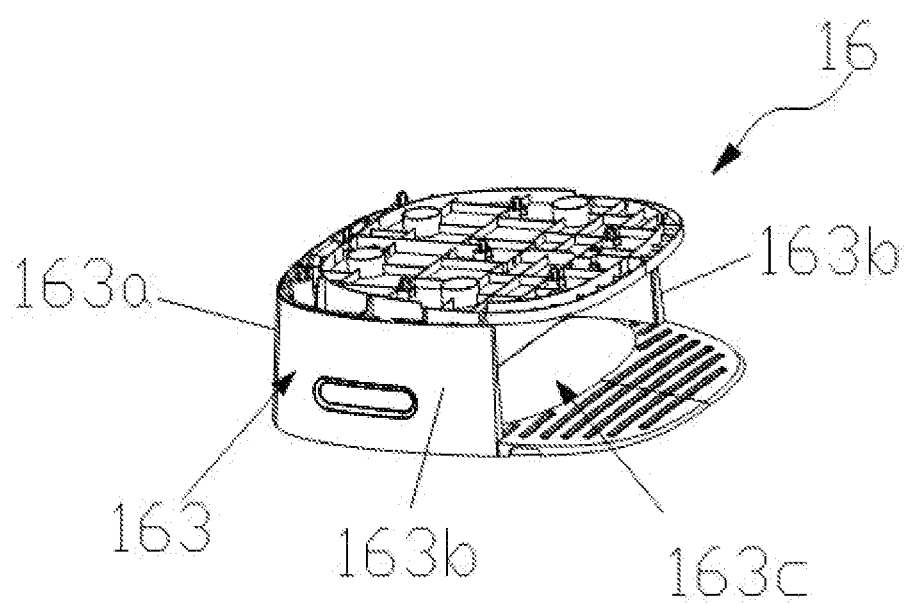
FIG. 7 is a schematic structural diagram of a first carrier base of a maintenance base station according to an embodiment of the present application.
Figure 8:
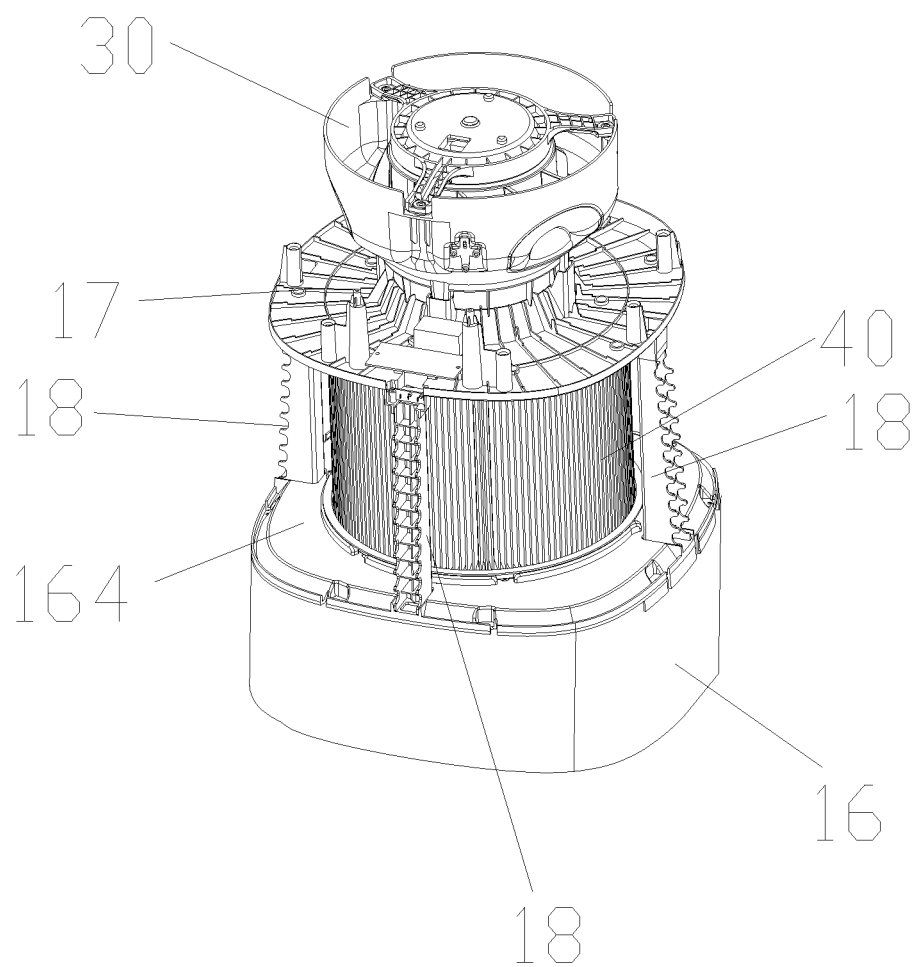
FIG. 8 is a partial schematic structural diagram I of a maintenance base station according to an embodiment of the present application.
Figure 9:
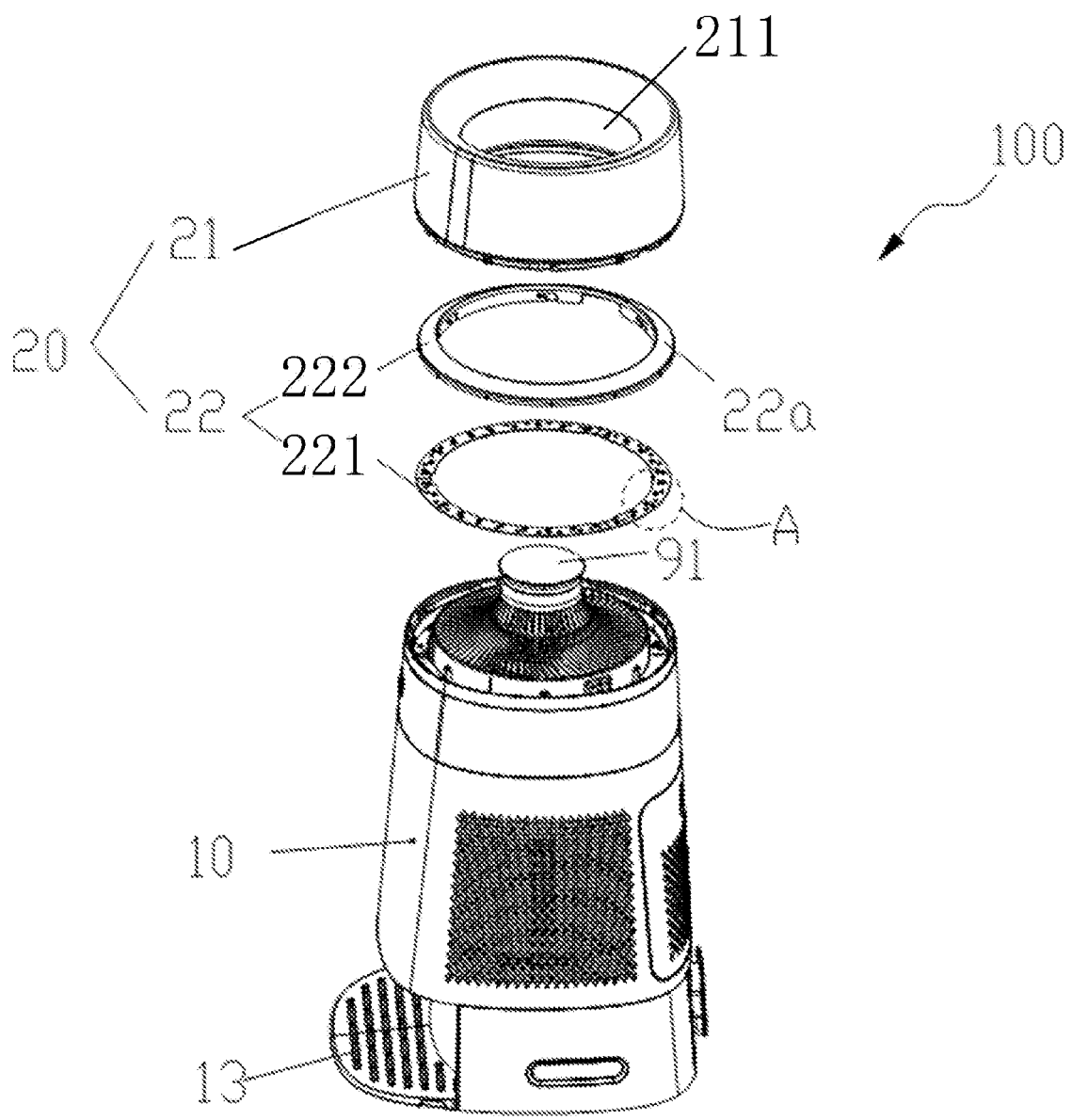
FIG. 9 is a partial schematic exploded structural diagram of a maintenance base station according to an embodiment of the present application.
Figure 10:
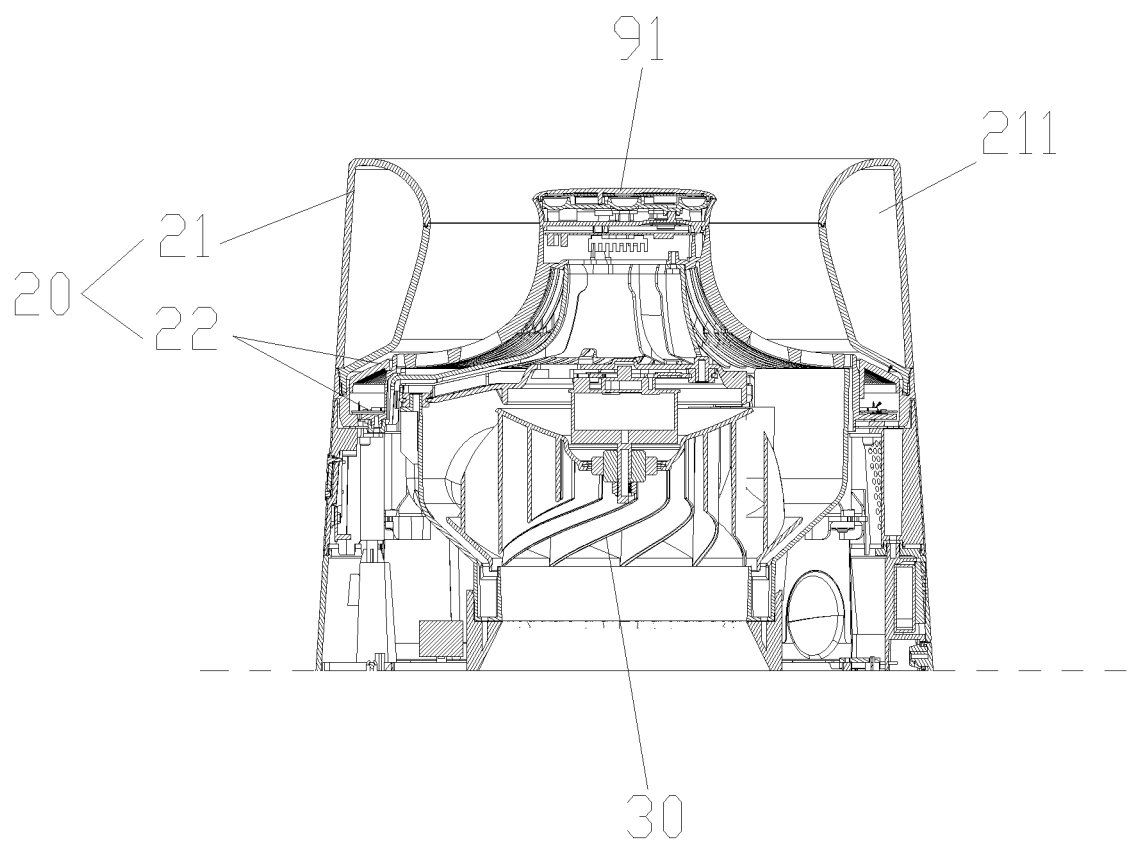
FIG. 10 is a partial schematic structural diagram II of a maintenance base station according to an embodiment of the present application.
Figure 11:
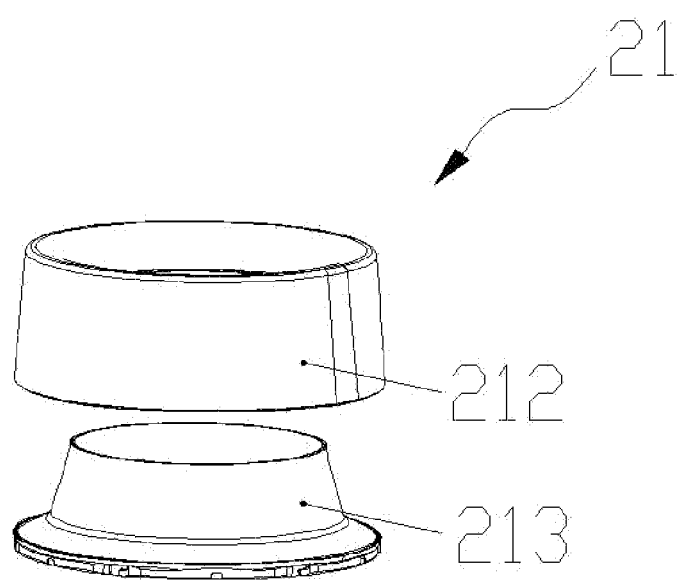
FIG. 11 is a schematic structural diagram of a diffuser of a maintenance base station according to an embodiment of the present application.
Figure 12:
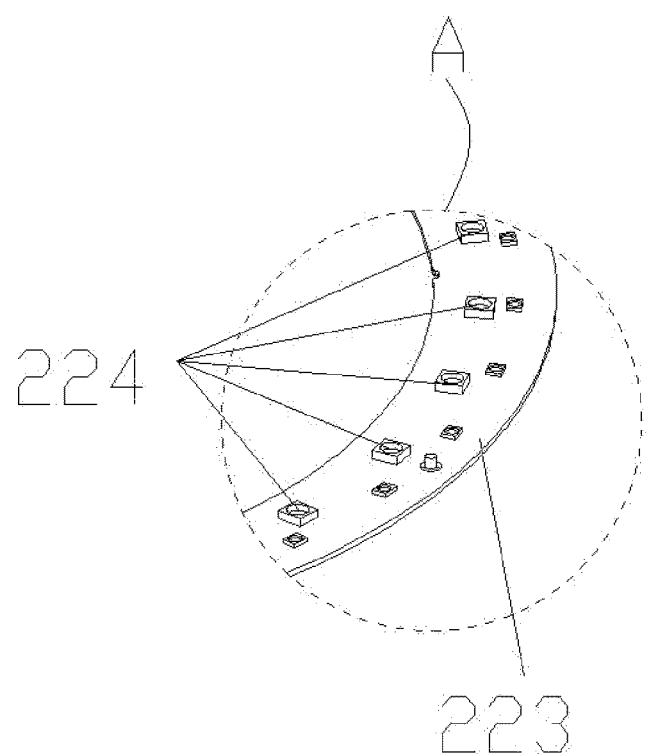
FIG. 12 is an enlarged schematic structural diagram of part A in FIG. 9.

Referring to FIGS. 1 and 6, it is to be understood that the maintenance base station 100 includes at least one function component 101, the maintenance base station 100 may include one or two or more than two function components 101. The at least one function component 101 may include any one or a combination of some of an air purification component, an illumination component, a loudspeaker component, a charging component, a suction power component for recycling waste in a dust box, a fresh water supply drive component, a sewage collection drive component, a mop cleaning drive component, and the like.

In this embodiment, the maintenance base station 100 can be configured to cooperate with the cleaning robot 200. The maintenance base station 100 is provided with a charging device 16b, such that the charging device 16b of the maintenance base station 100 can be configured to provide a charging maintenance service to the cleaning robot 200 during the period when the cleaning robot 200 is docked at the maintenance base station 100. In addition to the charging maintenance service, those skilled in the art may further extend the configuration of a carrier base according to needs. For example, the maintenance base station 100 may provide at least one of the maintenance services of mop cleaning, waste recycling, sewage collection and fresh water supply to the cleaning robot 200. Accordingly, the maintenance base station 100 may be provided with at least one of a mop cleaning device, a dust box waste recycling device, a sewage collection device, a fresh water supply device, and the like. The mop cleaning device includes a mop cleaning component. The dust box waste recycling device includes a suction power component (e.g., a fan) for recycling waste in the dust box. The sewage collection device includes a sewage collection drive component (e.g. a sewage pump). The fresh water supply device includes a fresh water supply drive component (e.g., a fresh water pump). The mop cleaning device includes a mop cleaning drive component (e.g. a drive motor) and/or a cleaning fluid supply component.

The maintenance base station 100 includes a man-machine interaction component 300, and the man-machine interaction component 300 includes a key component 91, or/and a speech recognition component 500. In this embodiment, the man-machine interaction component 300 includes a key component 91 and a speech recognition component 500. In other embodiments, the man-machine interaction component 300 includes a key component 91 and does not include a speech recognition component 500; or, the man-machine interaction component 300 includes a speech recognition component 500 and does not include a key component 91.

The key component 91 is provided with a first key portion 91a and a second key portion 91b, the first key portion 91a and the second key portion 91b are both electrically connected to the controller 400, and the first key portion 91a is configured to trigger a first man-machine interaction signal and the second key portion 91b is configured to trigger a second man-machine interaction signal. The first man-machine interaction signal indicates that the device type is the cleaning robot 200, and the second man-machine interaction signal indicates that the device type is the function component 101 of the maintenance base station 100.

When the user presses the first key portion 91a on the key component 91, the determination of the first man-machine interaction signal is triggered, and the device type indicated by the first man-machine interaction signal is the cleaning robot 200, so that the cleaning robot 200 can be controlled to work. For example, the function of the first key portion 91a can be set as starting cleaning, stopping cleaning, starting recharging, or pausing recharging, and correspondingly, the device type indicated by the first man-machine interaction signal is the cleaning robot 200, and the device task type indicated by the first man-machine interaction signal may be starting cleaning, stopping cleaning, starting recharging, or pausing recharging, so that the cleaning robot 200 can be controlled to start cleaning, stop cleaning, start recharging, or pause recharging.

When the user presses the second key portion 91b on the key component 91, the determination of the second man-machine interaction signal is triggered, and the device type indicated by the second man-machine interaction signal is the function component 101 of the maintenance base station 100, so that the function component 101 of the maintenance base station 100 can be controlled to work.

For example, the function of the second key 91b can be set as starting air purification, stopping air purification, increasing air speed of air purification, or decreasing air speed of air purification, and correspondingly, the device type indicated by the second man-machine interaction signal is the air purification component of the maintenance base station 100, and the device task type indicated by the second man-machine interaction signal may be starting air purification, stopping air purification, increasing air speed of air purification, or decreasing air speed of air purification, so that the air purification component of the maintenance base station 100 can be controlled to start air purification, stop air purification, increase air speed of air purification, or decrease air speed of air purification.

For example, the function of the second key portion 91b can be set as starting illumination, stopping illumination, increasing illumination brightness, decreasing illumination brightness, or switching lighting color, and correspondingly, the device type indicated by the second man-machine interaction signal is the illumination component of the maintenance base station 100, and the device task type indicated by the second man-machine interaction signal may be starting illumination, stopping illumination, increasing illumination brightness, decreasing illumination brightness, or switching lighting color, so that the illumination component of the maintenance base station 100 can be controlled to start illumination, stop illumination, increase illumination brightness, decrease illumination brightness, or switch lighting color.

For example, the function of the second key portion 91b can be set as starting playing music, stopping playing music, increasing volume, decreasing volume, or switching songs, and correspondingly, the device type indicated by the second man-machine interaction signal is the loudspeaker component of the maintenance base station 100, and the device task type indicated by the second man-machine interaction signal may be starting playing music, stopping playing music, increasing volume, decreasing volume, or switching songs, so that the loudspeaker component of the maintenance base station 100 can be controlled to start playing music, stop playing music, increase volume, decrease volume, or switch music.

For example, the function of the second key portion 91b can be set as starting mop cleaning, stopping mop cleaning, cleaning the mop with detergent, or cleaning the mop with water, and correspondingly, the device type indicated by the second man-machine interaction signal is the mop cleaning component of the maintenance base station 100, and the device task type indicated by the second man-machine interaction signal may be starting mop cleaning, stopping mop cleaning, cleaning the mop with detergent, or cleaning mop with water, so that the mop cleaning component of the maintenance base station 100 can be controlled to start mop cleaning, stop mop cleaning, clean the mop with detergent, or clean the mop with water. In some embodiments, when the user presses the second key portion 91b, the cleaning robot automatically returns to the maintenance base station for maintenance, and the maintenance base station 100 can control the mop cleaning component to start mop cleaning, stop mop cleaning, clean the mop with detergent, or clean the mop with water, based on the second man-machine interaction signal. Thus, the purpose of mop cleaning can be achieved according to the user's needs, which helps to improve the mopping cleanliness.

It can be seen that the user can control the maintenance base station 100 and the cleaning robot 200 respectively through the key component 91 on the maintenance base station 100, and the user does not have to find the cleaning robot 200 first and then press a body key on the cleaning robot 200 to control the cleaning robot 200, thus bringing more convenience to use and being conducive to improving the user experience.

It is to be understood that the key component 91 may include one or two or more than two first key portions 91a, and two or more first key portions 91a can be configured to control the cleaning robot 200 to perform different work tasks; similarly, the key component 91 may include one or two or more than two second key portions 91b, and two or more second key portions 91b can be configured to control the same function component 101 of the maintenance base station 100 to perform different work tasks; alternatively, two or more second key portions 91b can be configured to separately control different function components 101 of the maintenance base station 100 to perform work tasks.

The speech recognition component 500 includes a first microphone 501 and a speech parsing component 80 electrically connected to the first microphone 501. The speech parsing component 80 is electrically connected to the controller 400, the first microphone 501 is configured to acquire speech input by the user, and the controller 400 parses the speech acquired by the first microphone 501 through the speech parsing component 80 to determine the man-machine interaction signal.

When the user sends speech towards the maintenance base station 100, the maintenance base station 100 can acquire the speech input by the user through the first microphone 501. The maintenance base station 100 determines the first man-machine interaction signal or the second man-machine interaction signal by parsing the speech through the speech parsing component 80. The first man-machine interaction signal indicates that the device type is the cleaning robot 200 and the second man-machine interaction signal indicates that the device type is the function component 101 of the maintenance base station 100.

For example, in a case that the speech input by the user includes a speech keyword (e.g., the speech includes a keyword such as "start cleaning", "stop cleaning", "start recharging", or "pause recharging"), the maintenance base station 100 determines the first man-machine interaction signal by parsing the speech through the speech parsing component 80, the first man-machine interaction signal indicates that the device type is the cleaning robot 200, and the first man-machine interaction signal indicates that the device task type may be starting cleaning, stopping cleaning, starting recharging, or pausing recharging.

For example, in a case that the speech input by the user includes a speech keyword (e.g., the speech includes a keyword such as "start air purification", "stop air purification", "increase air speed of air purification", or "decrease air speed of air purification"), the maintenance base station 100 determines the second man-machine interaction signal by parsing the speech through the speech parsing component 80, the second man-machine interaction signal indicates that the device type is the air purification component of the maintenance base station 100, and the second man-machine interaction signal indicates that the device task type may be starting air purification, stopping air purification, increasing air speed of air purification, or decreasing air speed of air purification.

For example, in a case that the speech input by the user includes a speech keyword (e.g., the speech includes a keyword such as "start illumination", "stop illumination", "increase brightness", "decrease brightness", or "switch lighting color"), the maintenance base station 100 determines the second man-machine interaction signal by parsing the speech through the speech parsing component 80, the second man-machine interaction signal indicates that the device type is the illumination component of the maintenance base station 100, and the second man-machine interaction signal indicates that the device task type may be starting illumination, stopping illumination, increasing brightness, decreasing brightness, or switching lighting color.

For example, in a case that the user sends speech (e.g., the speech includes a keyword "start playing music", "stop playing music", "increase volume", or "decrease volume") to the maintenance base station 100, the maintenance base station 100 determines the second man-machine interaction signal by parsing the speech through the speech parsing component 80, the second man-machine interaction signal indicates that the device type is the loudspeaker component of the maintenance base station 100, and the second man-machine interaction signal indicates that the device task type may be starting playing music, pausing playing music, switching music, increasing volume, and decreasing volume, so that the loudspeaker component of the maintenance base station 100 can be controlled to start playing music, pause playing music, increase volume, and decrease volume.

For example, in a case that the user sends speech (e.g., the speech includes a keyword such as "start mop cleaning", "stop mop cleaning", "clean the mop with detergent", or "clean the mop with water") to the maintenance base station 100, the maintenance base station 100 determines the second man-machine interaction signal by parsing the speech through the speech parsing component 80, the second man-machine interaction signal indicates that the device type is the mop cleaning component of the maintenance base station 100, the second man-machine interaction signal indicates that the device task type may be starting mop cleaning, stopping mop cleaning, cleaning the mop with detergent, or cleaning the mop with water. In some embodiments, in a case that the user sends speech (e.g., the speech includes a keyword such as "start mop cleaning", "stop mop cleaning", "clean the mop with detergent", or "clean the mop with water") to the maintenance base station 100, the cleaning robot can automatically return to the maintenance base station for maintenance, and the maintenance base station 100 can control the mop cleaning component to start mop cleaning, stop mop cleaning, clean the mop with detergent, or clean the mop with water based on the second man-machine interaction signal, thus achieving the purpose of mop cleaning according to user's needs and helping to improve the mopping cleanliness. The cleaning robot can then proceed with the previous cleaning work after the maintenance is completed.

It is to be understood that the speech keyword is not limited to the above examples. Those skilled in the art may set the speech keyword according to the work tasks that the maintenance base station 100 can perform, and set the speech keyword according to the work tasks that the cleaning robot 200 can perform.

Referring to FIGS. 1 to 5, the maintenance base station 100 further includes a first wireless communication component 92 configured to establish a wireless communication link with the cleaning robot 200;

the controller 400 is electrically connected to the first wireless communication component 92, and the controller 400 is further configured to:
in a case that the device type indicated by the man-machine interaction signal is the cleaning robot 200, determine a first device task instruction based on the man-machine interaction signal, control the first wireless communication component 92 to work, and transmit the first device task instruction to the cleaning robot 200 by means of the first wireless communication component 92 to control the cleaning robot to perform a corresponding task, the first device task instruction being associated with a preset type of cleaning robot 200.

In this embodiment, the first wireless communication component 92 may be an infrared communication component, a 433 MHz wireless communication component or a Bluetooth component, etc. The cleaning robot 200 is provided with a second wireless communication component 220. The second wireless communication component 220 may be an infrared communication component, a 433 MHz wireless communication component or a Bluetooth component, etc. The second wireless communication component 220 and the first wireless communication component 92 are the same wireless communication components, so that the first wireless communication component 92 can establish a wireless communication link with the second wireless communication component 220 under the same communication protocol to enable the maintenance base station 100 to establish a wireless communication link with the cleaning robot 200, thereby bringing convenience for the cleaning robot 200 to perform wireless communication to exchange data with the maintenance base station 100 at a location far away from the maintenance base station 100.

The man-machine interaction signal indicates the device type is the cleaning robot 200 or the function component 101 of the maintenance base station 100. The man-machine interaction component 300 includes a key component 91, or/and a speech recognition component 500. The key component 91 triggers the first man-machine interaction signal and the second man-machine interaction signal through the first key portion 91a and the second key portion 91b, respectively. The first man-machine interaction signal indicates that the device type is the cleaning robot 200 and the second man-machine interaction signal indicates that the device type is the function component 101 of the maintenance base station 100. The maintenance base station 100 can acquire the speech input by the user through the first microphone 501. The maintenance base station 100 determines the first man-machine interaction signal or the second man-machine interaction signal by parsing the speech through the speech parsing component 80. The first man-machine interaction signal indicates that the device type is the cleaning robot 200 and the second man-machine interaction signal indicates that the device type is the function component 101 of the maintenance base station 100. Working principles of the key component 91 and the speech recognition component 500 can be referred to the previous descriptions, which will not be repeated herein. By means of the key component 91, the user can control the cleaning robot 200 and the maintenance base station 100 through the first key 91*a* and the second key 91*b* respectively when the user is close to the maintenance base station 100. By means of the speech recognition component 500, the user can control the cleaning robot 200 and the maintenance base station 100 through the speech respectively when the user is close to or far from the maintenance base station 100.

The first device task instruction includes at least one of starting cleaning, pausing cleaning, starting recharging, and pausing recharging. For example, when the user needs to start an indoor cleaning task, the user interacts on the man-machine interaction component 300 of the maintenance base station 100 to trigger the man-machine interaction component 300 to send the first man-machine interaction signal, where the device type indicated by the man-machine interaction signal is the cleaning robot 200 and the device task type indicated by the man-machine interaction signal is starting cleaning, so that the maintenance base station 100 can transmit the first device task instruction including the starting cleaning to the cleaning robot 200 by means of the first wireless communication component 92, and then the cleaning robot 200 can start the cleaning task based on the received first device task instruction. When the user needs to recall the cleaning robot 200, the user interacts on the man-machine interaction component 300 of the maintenance base station 100 to trigger the man-machine interaction component 300 to send the first man-machine interaction signal, where the device type indicated by the man-machine interaction signal is the cleaning robot 200 and the device task type indicated by the man-machine interaction signal is starting recharging, so that the maintenance base station 100 can transmit the first device task instruction including the starting recharging to the cleaning robot 200 by means of the first wireless communication component 92, and then the cleaning robot 200 can start the recharging task based on the received first device task instruction.

Further, the step that the controller 400 controls the first wireless communication component 92 to work based on the first device task instruction includes:

in a first step, the controller 400 determines a robot identification code based on the first device task instruction, and the robot identification code is configured to indicate the preset type of cleaning robot 200; and in a second step, the controller 400 controls the first wireless communication component 92 to transmit a broadcast signal to the outside based on the first device task instruction and the robot identification code such that the cleaning robot 200 receives the broadcast signal and then determines whether to perform a task corresponding to the first device task instruction based on the robot identification code.

In this embodiment, the robot identification code is used for identifying a preset type of cleaning robot 200. A plurality of types of device identification codes are pre-stored in a memory of the maintenance base station 100, and the plurality of types of device identification codes include a robot identification code. The robot identification code is associated with the first device task instruction. The controller 400 searches the robot identification code from the plurality of types of device identification codes based on the first device task instruction. A preset robot identification code is pre-stored in the memory of the cleaning robot 200. The cleaning robot 200 determines whether the robot identification code in the broadcast signal matches the preset robot identification code. If yes, the cleaning robot 200 determines to perform a task corresponding to the first device task instruction, and if not, the cleaning robot 200 refuses to perform a task corresponding to the first device task instruction, so that it is possible to ensure that the preset type of cleaning robot 200 is paired with the maintenance base station 100, and avoid misoperation of the cleaning robot 200 after receiving an irrelevant task instruction. The first device task instruction includes at least one of starting cleaning, pausing cleaning, starting recharging and pausing recharging. Those skilled in the art can set the content of the first device task instruction based on the function of the cleaning robot 200.

In some embodiments, the plurality of types of device identification codes include a smart device identification code, the smart device identification code is associated with a smart device task instruction. When the user interacts on the man-machine interaction component 300 of the maintenance base station 100 to trigger a third man-machine interaction signal from the man-machine interaction component 300, the device type indicated by the third man-machine interaction signal is a preset smart device, the controller 400 determines the smart device task instruction based on the third man-machine interaction signal, and then the controller 400 determines the smart device identification code based on the smart device task instruction, and the smart device identification code is associated with the smart device task instruction. The controller 400 controls the first wireless communication component 92 to transmit a broadcast signal to the outside based on the smart device task instruction and the robot identification code such that the preset smart device receives the broadcast signal and then determines whether to perform a task corresponding to the smart device task instruction based on the smart device identification code. The preset smart device may be any one of a smart TV, a smart refrigerator, a smart air conditioner or a smart lamp. Those skilled in the art can set the content of the smart device task instruction based on the function of the preset smart device.

Referring to FIGS. 1 and 6, in some embodiments, the function component 101 of the maintenance base station 100 includes an air purification component 600, and the controller 400 is electrically connected to the air purification component 600.

In a case that the device type indicated by the man-machine interaction signal is the air purification component 600 of the maintenance base station 100, the controller 400 determines a second device task instruction based on the man-machine interaction signal, and the controller 400 controls the air purification component 600 to perform a corresponding task based on the second device instruction. The second device task instruction is associated with the air purification component 600, and including at least one of starting air purification, pausing air purification, increasing air speed and decreasing air speed.

Referring to FIGS. 6 to 12, in some embodiments, the maintenance base station 100 includes a first carrier base 16, a second carrier base 17 and a first supporting assembly 18. The first carrier base 16 is located at the bottom of the maintenance base station 100. The first carrier base 16 is configured to carry the cleaning robot 200. The second carrier base 17 is spaced apart from the first carrier base 16 in a height direction of the maintenance base station 100. The second carrier base 17 is configured to carry a first function component. The first supporting assembly 18 is fixedly connected to the first carrier base 16 and the second carrier base 17 and separates the first carrier base 16 from the second carrier base 17 to enable the first function component to work at the position with a preset height. The first function component includes the air purification component 600. The first carrier base 16 includes a first platform 161, a second platform 162 disposed opposite the first platform 161, and a shell structure 163 connecting the first platform 161 and the second platform 162. The first platform 161 is used for the cleaning robot 200 to dock, and the second platform 162 is spaced apart from the first platform 161 in the height direction of the maintenance base station 100. A spacing between the second platform 162 and the first platform 161 forms a storage space 163d. The cleaning robot 200 can be accommodated in the storage space 163d between the first platform 161 and the second platform 162 when the cleaning robot 200 is docked on the first platform 161. The second platform 162 extends substantially in a horizontal direction, that is, the second platform 162 is substantially parallel to the ground. The shell structure 163 is fixedly connected between the first platform 161 and the second platform 162. The shell structure 163, the first platform 161 and the second platform 162 enclose to form the storage space 163d. The shell structure 163 is substantially "U" shaped. The shell structure 163 includes a first side shell 163a and two opposite second side shells 163b. The first side shell 163a and the two the second side shells 163b form the "U" shaped shell structure 163, so that the first carrier base 16 has a sufficient structural strength to carry the second carrier base 17 and the first supporting assembly 18 stably. An entrance 163c is formed between the two second side shells 163b. The entrance 163c is disposed opposite the first side shell 163a. The entrance 163c communicates with the storage space 163d. The cleaning robot 200 can enter the storage space 163d through the entrance 163c. The charging device 16b includes a pair of charging electrode plates, the pair of charging electrode plates may be arranged on the first platform 161, or, the pair of charging electrode plates may be disposed on the first side shell 163a. The pair of charging electrode plates is configured to dock with a pair of charging contacts of the cleaning robot 200 to charge the cleaning robot 200.

The air purification component 600 includes a fan device 30. The fan device 30 is configured to implement air purification. The fan device 30 is maintained on the second carrier base 17. An air inlet end of the fan device 30 is disposed downward and an air outlet end of the fan device 30 is disposed upward. It is to be understood that the fan device 30 needs to be mounted at a suitable height to meet the flow requirements of air sucked into the space below by the air inlet end of the fan device 30. The air sucked by the fan device 30 is discharged upwards from the air outlet end. An accommodating space 16a is formed by the spacing between the second carrier base 17 and the first carrier base 16, thereby providing a mounting space for the installation of a filter screen 40. The filter screen 40 is in the form of a hollow cylinder. Two ends of the filter screen 40 are sealed and fit to the first carrier base 16 and the second carrier base 17 respectively. The hollow portion of the filter screen 40 is communicated to the air inlet end of the fan device 30. When the fan device 30 is started, the fan device 30 generates a negative vacuum pressure in the hollow portion of the filter screen 40 to suck outside air to pass through the filter screen 40 to enter the hollow portion of the filter screen 40, to enter the air inlet end of the fan device 30, and then is discharged upwardly to the outside from the air outlet end of the fan device 30. In the process of air passing through the filter screen 40, the filter screen 40 filters the air to intercept impurities in the air, so as to achieve an air purification effect. The purified air is discharged through the air outlet end of the fan device 30. The filter screen 40 is in the form of a hollow cylinder. The filter screen 40 can receive the surrounding air in all directions and filter the air. The filter screen 40 has a relatively large filtering area. The second carrier base 17 and the first carrier base 16 are spaced apart in the height direction of the maintenance base station 100, so that the filter screen 40 with a certain height can be mounted between the second carrier base 17 and the first carrier base 16. This is conducive to further increasing the filtering area of the filter screen 40, thereby helping to increase a flow rate of air intake of the fan device 30, and facilitating rapid purification of indoor air.

It is to be understood that the air purification component 600 may also be in other structural forms. Those skilled in the art can adjust it with reference to the design of existing air purifiers.

Referring to FIGS. 1 and 6, in some embodiments, the function component 101 of the maintenance base station 100 includes an illumination component 20, and the controller 400 is electrically connected to the illumination component 20.

In a case that the device type indicated by the man-machine interaction signal is the illumination component 20 of the maintenance base station 100, the controller 400 determines a third device task instruction based on the man-machine interaction signal, and the controller 400 controls the illumination component 20 to perform a corresponding task based on the third device instruction. The third device task instruction is associated with the illumination component 20, and including at least one of turning on the light, turning off the light, increasing illuminating brightness, decreasing illuminating brightness, and changing lighting color.

Referring to FIGS. 6 to 12, in this embodiment, the maintenance base station 100 includes a base station body 10 and an illumination component 20. The illumination component 20 includes a diffuser 21 and a light source assembly 22. The diffuser 21 covers the base station body and is provided with a cavity 211, and the light source assembly 22 is configured to emit light toward the cavity 211 of the diffuser 21.

The base station body 10 has a bottom and a top disposed relative to the bottom. The base station body 10 is provided with a docking platform 13 at the bottom. The docking platform 13 is used for the cleaning robot 200 to dock, thus facilitating maintenance of the cleaning robot 200 by the maintenance base station 100 during the period when the cleaning robot 200 is docked. The top is located at the highest position of the base station body 10. The diffuser 21 covers the top of the base station body 10 such that the diffuser 21 is located at the highest position of the maintenance base station 100. The light source assembly 22 projects light to the outside through the diffuser 21 to illuminate a larger area, so that the light emitted by the light source assembly 22 is reflected and scattered in the cavity 211 of the diffuser 21, and finally refracted to the outside through the diffuser 21. This enables the light emitted by the light source assembly 22 to be diffused in the diffuser 21, so that the diffuser 21 can present an ambient lighting effect.

The light source assembly 22 includes a light emitting surface 22a, and the light emitting surface 22a may be a flat surface, or a curved surface. Those skilled in the field can adjust the specific shape of the light emitting surface 22a according to actual needs. The light source assembly 22 emits light to the inside of the diffuser 21 through the light emitting surface 22a. In this embodiment, the light emitting surface 22a of the light source assembly 22 is shaped as an annular conical surface, which allows the light source assembly 22 to have a larger light emitting area, thereby providing more light into the cavity 211 of the diffuser 21 to achieve a better ambient lighting effect.

The diffuser 21 includes a first half-shell 212 and a second half-shell 213, the first half-shell 212 and the second half-shell 213 being enclosed to form the cavity 211. The light source assembly 22 is located outside the diffuser 21, the light source assembly 22 is arranged on the top position of the base station body 10, the diffuser 21 covers the top position of the base station body 10, and the diffuser 21 covers the light source assembly 22, so that all the light emitted by the light source assembly 22 can enter the inside of the cavity 211 of the diffuser 21, making the surface light ray further uniformly dispersed in the three-dimensional space of the cavity 211 of the diffuser 21. Thus, a uniform three-dimensional light effect is formed in the diffuser 21, which is conducive to improving the illumination effect, helping to achieve the ambient lighting effect in a larger projection range.

Referring to FIGS. 6 to 12, in some embodiments, the light source assembly 22 includes a light emitting device 221 and a light guide 222. The light emitting device 221 is configured to emit light to the light guide 222 to uniformly scatter the light emitted by the light emitting device 221 through the light guide 222. The light guide 222 directs the scattered light into the cavity 211 of the diffuser 21.

The light emitting device 221 includes a circuit board 223 and a plurality of light beads 224 arranged on one side of the circuit board 223. The plurality of light beads 224 on the circuit board 223 form a dot-matrix light source. The light guide 222 is disposed opposite the light emitting device 221, and a surface of one side of the light guide 222 is used for receiving light from the plurality of light beads 224 so that the light of the dot-matrix light source composed of the plurality of light beads 224 is evenly dispersed on the light guide 222. A surface of the light guide 222 on the side away from the plurality of lamp beads 224 forms the light emitting surface 22a, and the light guide 222 directs the light of the plurality of lamp beads 224 out through the light emitting surface 22a to form an surface light source, so that a uniform surface light ray can be provided to the diffuser 21. The circuit board 223 is disposed substantially parallel to a horizontal direction, so that it is easy to arrange the circuit board 223 horizontally on the top of the base station body 10. The circuit board 223 occupies little space and does not occupy the internal space of the base station body 10.

The light guide 222 has a shape set corresponding to a distribution shape of the plurality of light beads 224. In this embodiment, the plurality of light beads 224 are arranged in a ring shape, and correspondingly, the light guide 222 is disposed in a ring shape. Of course, in other embodiments, those skilled in the art can adjust the shape of the light guide 222 and the distribution shape of the plurality of light beads 224 according to the actual needs, which are not limited to the above-mentioned shapes.

Referring to FIGS. 1 and 6, in some embodiments, the function component of the maintenance base station 100 includes a loudspeaker component 60, and the controller 400 is electrically connected to the loudspeaker component 60.

In a case that the device type indicated by the man-machine interaction signal is the loudspeaker component 60 of the maintenance base station 100, the controller 400 determines a fourth device task instruction based on the man-machine interaction signal, and the controller 400 controls the loudspeaker component 60 to perform a corresponding task based on the fourth device instruction. The fourth device task instruction is associated with the loudspeaker component 60, and including at least one of starting playing music, pausing playing music, switching music, increasing volume, and decreasing volume.

Referring to FIGS. 1 to 5, further, the cleaning robot 200 includes a second microphone 210, and the second microphone 210 is configured to acquire speech input by a user. The man-machine interaction component 300 includes a speech parsing component 80, and the controller 400 is electrically connected to the speech parsing component 80.

The controller 400 receives the speech acquired by the second microphone 210 through the first wireless communication component 92, and parses the speech acquired by the second microphone 210 through the speech parsing component 80 to determine the man-machine interaction signal.

In this embodiment, the first wireless communication component 92 may be an infrared communication component, a 433 MHz wireless communication component or a Bluetooth component, etc. The cleaning robot 200 is provided with a second wireless communication component 220. The second wireless communication component 220 may be an infrared communication component, a 433 MHz wireless communication component or a Bluetooth component, etc. The second wireless communication component 220 and the first wireless communication component 92 are the same wireless communication components, so that the first wireless communication component 92 can establish a wireless communication link with the second wireless communication component 220 under the same communication protocol to enable the maintenance base station 100 to establish a wireless communication link with the cleaning robot 200, thereby bringing convenience for the cleaning robot 200 to perform wireless communication to exchange data with the maintenance base station 100 at a location far away from the maintenance base station 100. The cleaning robot 200 may forward the speech acquired by the second microphone 210 to the first wireless communication component 92 of the maintenance base station 100 by means of the second wireless communication component 220, that is, the maintenance base station 100 receives the speech acquired by the second microphone 210 through the first wireless communication component 92, and then the controller 400 parses the speech acquired by the second microphone 210 through the speech parsing component 80 to determine whether the man-machine interaction signal is a first man-machine interaction signal or a second man-machine interaction signal. The first man-machine interaction signal indicates that the device type is the cleaning robot 200 and the second man-machine interaction signal indicates that the device type is the function component 101 of the maintenance base station 100. Working principles of the first man-machine interaction signal and the second man-machine interaction signal are described in the previous description, which will not be repeated here.

Figure 13:
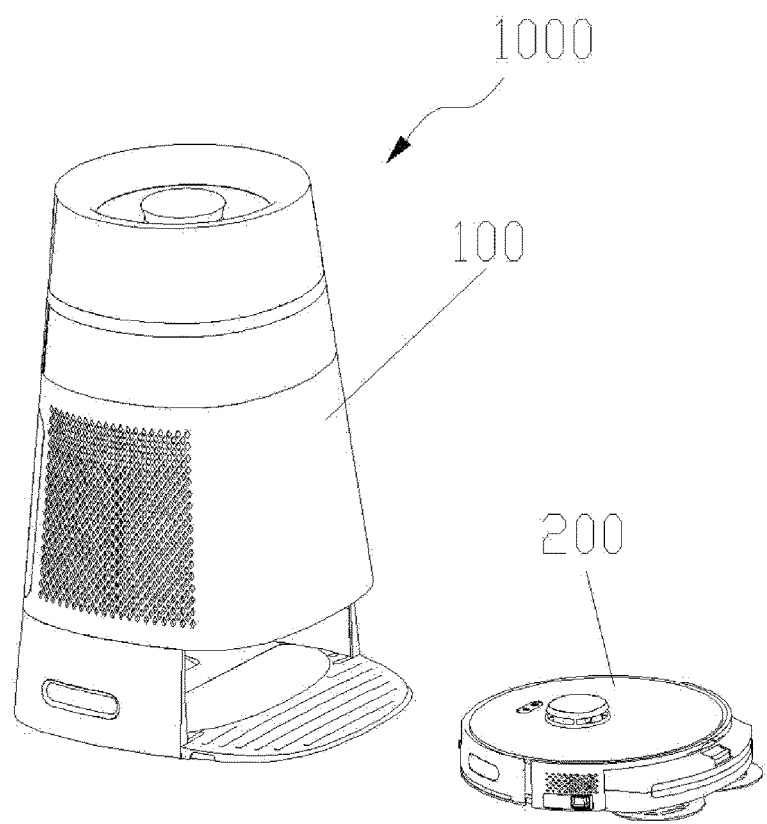
FIG. 13 is a schematic diagram of a cleaning robot system according to an embodiment of the present application.

Referring to FIG. 13, an embodiment of the present application further provides a cleaning robot system 1000. The cleaning robot system 1000 includes the cleaning robot 200 and the maintenance base station 100 as described above.

It is to be understood that the cleaning robot 200 may be a sweeping robot, a sweeping and mopping integrated robot, a mopping robot, a floor scrubbing robot, a floor washing robot, or an air purification robot, etc. The cleaning robot 200 is configured to perform surface cleaning tasks, can clean dust and debris on the floor in an all-round manner, thus improving the cleanliness of an indoor environment in an all-round manner. The surface cleaning tasks may include any one or a combination of some of sweeping, vacuuming, scrubbing, washing and mopping.

The foregoing descriptions are merely preferable embodiments of the present application, but are not intended to limit the present application. Any modifications, equivalent substitutions, or improvements made within the spirit and principle of the application shall fall within the scope of protection of the present application.

What is claimed is:

1. A maintenance base station, configured to cooperate with a cleaning robot, and comprising:
    at least one function component;
    a man-machine interaction component configured to receive a user input and determine a man-machine interaction signal based on the user input, and the man-machine interaction signal indicates a device type and a device task type, wherein a device indicated by the device type at least comprises the cleaning robot or the function component of the maintenance base station; and
    a controller electrically connecting the function component and the man-machine interaction component, wherein the controller is configured to receive the man-machine interaction signal and call the corresponding device to work based on the man-machine interaction signal;
    wherein the maintenance base station includes a first carrier base, a second carrier base and a first supporting assembly, and the first carrier base is located at the bottom of the maintenance base station and configured to carry the cleaning robot, and the second carrier base is spaced apart from the first carrier base in a height direction of the maintenance base station, and the first supporting assembly is fixedly connected to the first carrier base and the second carrier base and separates the first carrier base from the second carrier base, and the the first carrier base is used for the cleaning robot to dock.

2. The maintenance base station according to claim 1, further comprising a first wireless communication component configured to establish a wireless communication link with the cleaning robot, wherein the first wireless communication component at least comprises one of an infrared communication component, a 433 MHz wireless communication component or a Bluetooth;
    wherein the controller is electrically connected to the first wireless communication component; and the controller is further configured to:
    in a case that the device type indicated by the man-machine interaction signal is the cleaning robot, determine a first device task instruction based on the man-machine interaction signal, control the first wireless communication component to work, and transmit the first device task instruction to the cleaning robot by means of the first wireless communication component to control the cleaning robot to perform a corresponding task, wherein the first device task instruction is associated with a preset type of cleaning robot.

3. The maintenance base station according to claim 2, wherein the first device task instruction comprises at least one of starting cleaning, pausing cleaning, starting recharging and pausing recharging.

4. The maintenance base station according to claim 2, wherein the step that the controller controls the first wireless communication component to work based on the first device task instruction comprises:
    determining a robot identification code based on the first device task instruction, wherein the robot identification code is configured to indicate the preset type of cleaning robot; and
    controlling the first wireless communication component to transmit a broadcast signal to the outside based on the first device task instruction and the robot identification code such that the cleaning robot receives the broadcast signal and then determines whether to perform a task corresponding to the first device task instruction based on the robot identification code.

5. The maintenance base station according to claim 1, wherein the function component of the maintenance base station comprises an air purification component, and the controller is electrically connected to the air purification component; and
    wherein in a case that the device type indicated by the man-machine interaction signal is the air purification component of the maintenance base station, the controller determines a second device task instruction based on the man-machine interaction signal, and the controller controls the air purification component to perform a corresponding task based on the second device instruction, wherein the second device task instruction is associated with the air purification component, and the second device task instruction comprising at least one of starting air purification, pausing air purification, increasing air speed and decreasing air speed.

6. The maintenance base station according to claim 1, wherein the function component of the maintenance base station comprises an illumination component, and the controller is electrically connected to the illumination component; and
    wherein in a case that the device type indicated by the man-machine interaction signal is the illumination component of the maintenance base station, the controller determines a third device task instruction based on the man-machine interaction signal, and the controller controls the illumination component to perform a corresponding task based on the third device instruction, wherein the third device task instruction is associated with the illumination component, and the third device task instruction comprising at least one of turning on the light, turning off the light, increasing illumination brightness, decreasing illumination brightness, and changing lighting color.

7. The maintenance base station according to claim 1, wherein the function component of the maintenance base station comprises a loudspeaker component, and the controller is electrically connected to the loudspeaker component; and wherein in a case that the device type indicated by the man-machine interaction signal is the loudspeaker component of the maintenance base station, the controller determines a fourth device task instruction based on the man-machine interaction signal, and the controller controls the loudspeaker component to perform a corresponding task based on the fourth device instruction, wherein the fourth device task instruction is associated with the loudspeaker component, and the fourth device task instruction comprising at least one of starting playing music, pausing playing music, switching music, increasing volume, and decreasing volume.

8. The maintenance base station according to claim 1, wherein the man-machine interaction component comprises a key component or a speech recognition component;
   wherein the first key portion and the second key portion are both electrically connected to the controller, wherein the first key portion is configured to trigger a first man-machine interaction signal and the second key portion is configured to trigger a second man-machine interaction signal, wherein the first man-machine interaction signal indicates that the device type is the cleaning robot, and the second man-machine interaction signal indicates that the device type is the function component of the maintenance base station; and
   wherein the speech recognition component comprises a first microphone and a speech parsing component electrically connected to the first microphone, and the speech parsing component is electrically connected to the controller, wherein the first microphone is configured to acquire speech input by a user, and the controller parses the speech acquired by the first microphone through the speech parsing component to determine the man-machine interaction signal.

9. The maintenance base station according to claim 1, wherein the man-machine interaction component comprises a first key portion and a second key portion and a speech recognition component;
   wherein the first key portion and the second key portion are both electrically connected to the controller, wherein the first key portion is configured to trigger a first man-machine interaction signal and the second key portion is configured to trigger a second man-machine interaction signal, wherein the first man-machine interaction signal indicates that the device type is the cleaning robot, and the second man-machine interaction signal indicates that the device type is the function component of the maintenance base station; and
   wherein the speech recognition component comprises a first microphone and a speech parsing component electrically connected to the first microphone, and the speech parsing component is electrically connected to the controller, wherein the first microphone is configured to acquire speech input by a user, and the controller parses the speech acquired by the first microphone through the speech parsing component to determine the man-machine interaction signal.

10. The maintenance base station according to claim 2, wherein the cleaning robot comprises a second microphone configured to acquire speech input by a user, wherein the man-machine interaction component comprises a speech parser, and the controller is electrically connected to the speech parser; and
    wherein the controller receives the speech acquired by the second microphone through the first wireless communication component, and the controller parses the speech acquired by the second microphone through the speech parser to determine the man-machine interaction signal.

11. The maintenance base station according to claim 1, wherein the first carrier base includes a first platform, a second platform disposed opposite the first platform, and a shell structure connecting the first platform and the second platform, and the first platform is used for the cleaning robot to dock, and the second platform is spaced apart from the first platform in the height direction of the maintenance base station, the first platform is used for the cleaning robot to dock.

12. The maintenance base station according to claim 11, wherein the shell structure includes a first side shell and two opposite second side shells, and the first side shell and the two the second side shells form a "U" shaped shell structure, and the maintenance base station is provided with a charging device, and the charging device includes a pair of charging electrode plates arranged on the first platform or the first side shell, the pair of charging electrode plates configured to dock with a pair of charging contacts of the cleaning robot to charge the cleaning robot.

13. The maintenance base station according to claim 1, wherein the function component of the maintenance base station includes an air purification component, the controller electrically connected to the air purification component, and the second carrier base is configured to carry the air purification component.

14. The maintenance base station according to claim 13, wherein the air purification component includes a fan device configured to implement air purification and maintained on the second carrier base, an air inlet end of the fan device disposed downward and an air outlet end of the fan device disposed upward, and an accommodating space is formed by the spacing between the second carrier base and the first carrier base, providing a mounting space for the installation of a filter screen, and the filter screen is in the form of a hollow cylinder, two ends of the filter screen sealed and fit to the first carrier base and the second carrier base respectively, and the hollow cylinder of the filter screen is communicated to the air inlet end of the fan device.

15. A cleaning robot system, comprising a cleaning robot and a maintenance base station, wherein the maintenance base station comprising:
    at least one function component;
    a man-machine interaction component configured to receive a user input and determine a man-machine interaction signal based on the user input, and the man-machine interaction signal indicates a device type and a device task type, wherein a device indicated by the device type at least comprises the cleaning robot or the function component of the maintenance base station; and
    a controller electrically connecting the function component and the man-machine interaction component, wherein the controller is configured to receive the man-machine interaction signal and call the corresponding device to work based on the man-machine interaction signal;
    wherein the maintenance base station includes a first carrier base, a second carrier base and a first supporting assembly, and the first carrier base is located at the bottom of the maintenance base station and configured to carry the cleaning robot, and the second carrier base is spaced apart from the first carrier base in a height direction of the maintenance base station, and the first supporting assembly is fixedly connected to the first carrier base and the second carrier base and separates the first carrier base from the second carrier base, and the first carrier base is used for the cleaning robot to dock.

16. The cleaning robot system according to claim 15, wherein the maintenance base station further comprising a first wireless communication component configured to establish a wireless communication link with the cleaning robot, wherein the first wireless communication component at least comprises one of an infrared communication component, a 433 MHz wireless communication component or a Bluetooth;

wherein the controller is electrically connected to the first wireless communication component; and the controller is further configured to:

in a case that the device type indicated by the man-machine interaction signal is the cleaning robot, determine a first device task instruction based on the man-machine interaction signal, control the first wireless communication component to work, and transmit the first device task instruction to the cleaning robot by means of the first wireless communication component to control the cleaning robot to perform a corresponding task, wherein the first device task instruction is associated with a preset type of cleaning robot.

17. The cleaning robot system according to claim 16, wherein the first device task instruction comprises at least one of starting cleaning, pausing cleaning, starting recharging and pausing recharging.

18. The cleaning robot system according to claim 16, wherein the step that the controller controls the first wireless communication component to work based on the first device task instruction comprises:

determining a robot identification code based on the first device task instruction, wherein the robot identification code is configured to indicate the preset type of cleaning robot; and controlling the first wireless communication component to transmit a broadcast signal to the outside based on the first device task instruction and the robot identification code such that the cleaning robot receives the broadcast signal and then determines whether to perform a task corresponding to the first device task instruction based on the robot identification code.

19. The cleaning robot system according to claim 15, wherein the function component of the maintenance base station comprises an air purification component, and the controller is electrically connected to the air purification component; and wherein in a case that the device type indicated by the man-machine interaction signal is the air purification component of the maintenance base station, the controller determines a second device task instruction based on the man-machine interaction signal, and the controller controls the air purification component to perform a corresponding task based on the second device instruction, wherein the second device task instruction is associated with the air purification component, and the second device task instruction comprising at least one of starting air purification, pausing air purification, increasing air speed and decreasing air speed.

* * * * *